(12) United States Patent
Yeh et al.

(10) Patent No.: US 8,337,066 B2
(45) Date of Patent: Dec. 25, 2012

(54) BACKLIGHT MODULE

(75) Inventors: Ke-ming Yeh, Banqiao (TW);
Cheng-min Liao, Zhongli (TW); Ju-yi Hsieh, Luzhu Township (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 0 days.

(21) Appl. No.: 12/982,623

(22) Filed: Dec. 30, 2010

(65) Prior Publication Data
US 2012/0081922 A1 Apr. 5, 2012

(30) Foreign Application Priority Data
Sep. 30, 2010 (TW) .............................. 99218953 U

(51) Int. Cl.
*F21V 7/04* (2006.01)
(52) U.S. Cl. ....... 362/612; 362/97.1; 362/620; 362/97.3
(58) Field of Classification Search .................. 362/600, 362/601, 606, 607, 612, 626, 620, 97.1–97.3
See application file for complete search history.

(56) References Cited

U.S. PATENT DOCUMENTS

| | | | | |
|---|---|---|---|---|
| 6,134,092 A * | 10/2000 | Pelka et al. | ...... | 361/31 |
| 6,530,670 B2 * | 3/2003 | Hirayama | ...... | 362/628 |
| 6,874,900 B2 * | 4/2005 | Hsieh | ...... | 362/26 |
| 7,637,646 B2 * | 12/2009 | Byun et al. | ...... | 362/608 |
| 7,717,605 B2 * | 5/2010 | Shibata | ...... | 362/630 |
| 7,738,053 B2 * | 6/2010 | Kubota | ...... | 349/65 |
| 7,789,549 B2 * | 9/2010 | Tanabe | ...... | 362/621 |
| 7,982,825 B2 * | 7/2011 | Kim et al. | ...... | 349/65 |
| 2002/0175632 A1 * | 11/2002 | Takeguchi | ...... | 315/169.1 |
| 2005/0001952 A1 * | 1/2005 | Han et al. | ...... | 349/65 |
| 2007/0008739 A1 * | 1/2007 | Kim et al. | ...... | 362/612 |

* cited by examiner

*Primary Examiner* — Danielle Allen
(74) *Attorney, Agent, or Firm* — Cheng-Ju Chiang

(57) ABSTRACT

A backlight module includes a light guide plate, a first light module, and a second light module. The light guide plate includes first troughs and second troughs on opposite sides. The first light module includes a first substrate and first LEDs thereon. An opaque element is disposed on each first gap between two adjacent first LEDs, each first LED is embedded in one first trough. The second light module includes a second substrate and second LEDs thereon. An opaque element is disposed on each second gap between two adjacent second LEDs, and each second LED is embedded in one second trough. Each first LED is disposed to one second gap, and each second LED is disposed in one first gap. Light from first LED is absorbed by the opaque element on the second substrate, and that from the second LED is absorbed by the opaque element on the first substrate.

6 Claims, 2 Drawing Sheets

BACKLIGHT MODULE

BACKGROUND OF THE INVENTION

1. Field of the Invention

The present invention relates to a backlight module, and more particularly, to a backlight module for an image display device.

2. Description of Prior Art

Human beings see real-world images using both eyes. Further, the human brain forms so-called 3D images (three-dimensional images) according to differences in spatial distance between two views seen by both eyes from two different angles. A so-called 3D display is designed to create simulations of human visual fields from different angles to help users perceive 3D images when viewing 2D images.

Nowadays, 3D displays are divided into two kinds. One is auto-stereoscopic displays; the other is stereoscopic displays. Users of auto-stereoscopic displays are able to view 3D images without wearing glasses with a unique structure while ones of stereoscopic displays have to wear specially designed glasses to view 3D images.

The principle of a parallax barrier type auto-stereoscopic 3D display is to cast parallax images towards each eye of the observer to create a stereoscopic effect in the brain via an opaque parallax barrier. The principle of a spatial sequential type auto-stereoscopic 3D display is to cast a group of pixels towards the right eye and another different group of pixels towards the left eye via a time-irrelevant parallax barrier. Further, signals provided by the two groups of pixels are given to the right and left eyes, respectively, to provide the eyes different images. But, the spatial sequential type has a disadvantage that it only has half the original resolution. The principle of a time sequential type auto-stereoscopic 3D display is to cast the same group of the pixels towards both eyes at different time points by using a parallax barrier which is time-relevant and drives synchronously with a display panel. Further, a signal provided by the group of pixels is given to the right eye and the left eye at different time points to provide both eyes different images.

The persistence of vision of the human eye occurs for a moment of time once a frame rate is at higher than 40 Hz. Therefore, both the persistence of vision and a view of 3D image are realized by controlling the light produced by different backlight sources to enter the right and left eyes, respectively, and by switching backlight sources to match a frame rate of the display panel which achieves higher than 60 Hz through circuits and image processing.

However, to well control light-emitting angles of backlight sources is required in this technology, so the progress of backlight has to be precise. Refer to FIG. 1 and FIG. 2. FIG. 1 illustrates the light produced by a light emitting diode (LED) 12 of a conventional backlight module 10, and FIG. 2 illustrates a light guide plate 14 of the conventional backlight module 10. As shown in FIG. 1, the light guide plate 14 reflects the light emitted from the LED 12, which causes a crosstalk effect from various progresses of backlight and lowers the quality of three-dimensional images. To solve this problem, black coating 16 is applied to gapes of a side opposite to a side where the LED 12 is placed to absorb the light from the LED 12. But this invention has several disadvantages, such as a limited light emission angle from the LED 12, influenced brightness of the LED 12, and an enhanced hot spot effect. Besides, the light radiates from the center of the LED 12 so the light intensity around the intermediate axis (optical axis) is strongest. Symmetrically arranged black coating 16 cannot absorb the main reflective light produced by the LED 12, so that the light around the intermediate axis reflects, which enhances the hot spot effect, instead.

SUMMERY OF THE INVENTION

It is therefore an object of the present invention is to provide a backlight module comprising a light guide plate, a first light module, and a second light module. The light guide plate comprises a plurality of first troughs on a first side and a plurality of second troughs on a second side opposite to the first side. The first light module comprises a first substrate and a plurality of first light emitting diodes disposed on the first substrate. An opaque element is disposed on each first gap between the two adjacent first light emitting diodes, each first light emitting diode is correspondingly embedded in one of the troughs. The second light module comprises a second substrate and a plurality of second light emitting diodes disposed on the first substrate. An opaque element is disposed on each second gap between the two adjacent second light emitting diodes, and each second light emitting diode is correspondingly embedded in one of the troughs. Each first light emitting diode is disposed in an alignment to one of the second gaps, and each second light emitting diode is disposed in an alignment to one of the first gaps.

In one aspect of the present invention, a plurality of opaque elements are disposed on a third side and a fourth side of the light guide plate, both perpendicular to the first side and the second side.

In another aspect of the present invention, the opaque element is dark tape or dark coating sticking to the first substrate and the second substrate.

In still another aspect of the present invention, the opaque elements stick to contact areas of the first and second sides of the light guide plate and the first substrate and the second substrate.

In yet another aspect of the present invention, the backlight module further comprises a plastic frame for fixing the first light module, the second light module, and the light guide plate, wherein the plastic frame is made of light proof material.

These and other objects of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENTS

Figure 1:
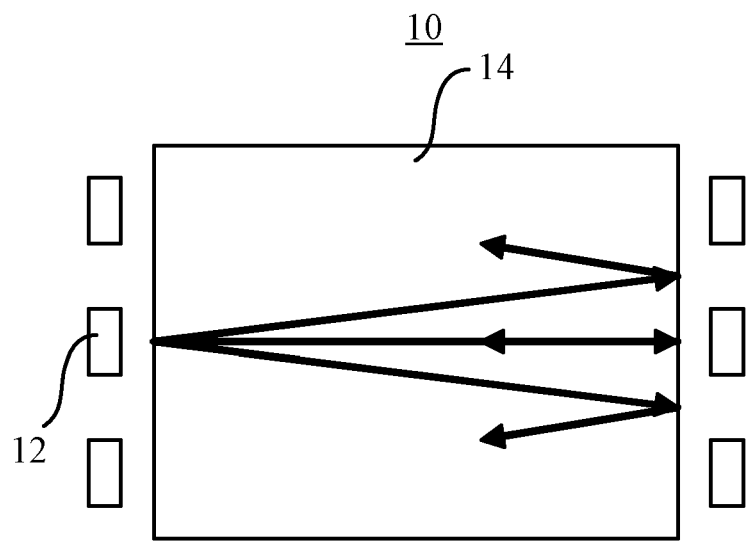
FIG. 1 illustrates the light produced by a light emitting diode of a conventional backlight module.
Figure 2:
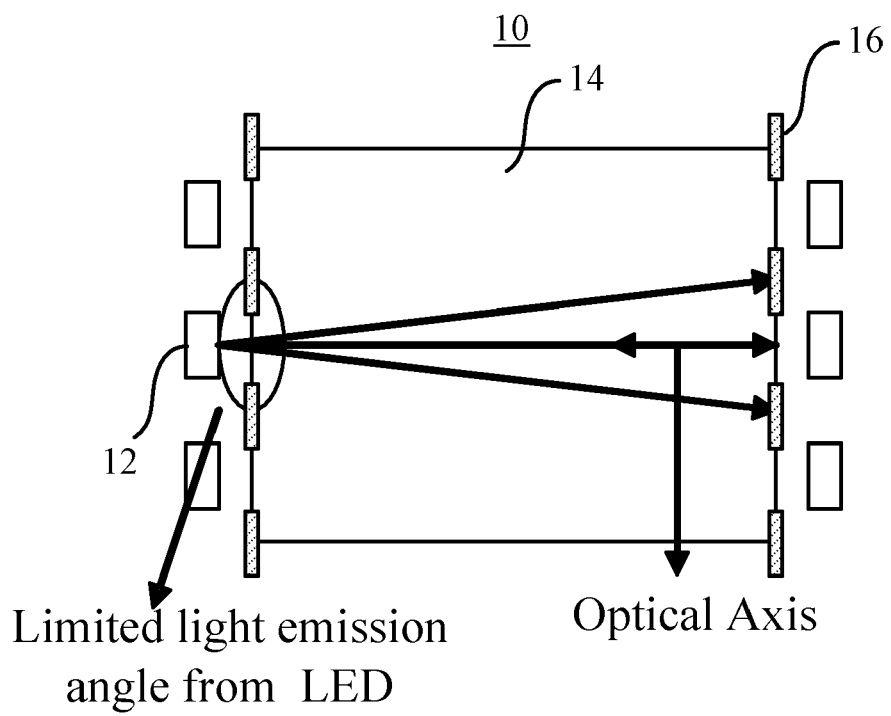
FIG. 2 illustrates a light guide plate of the conventional backlight module.
Figure 3:
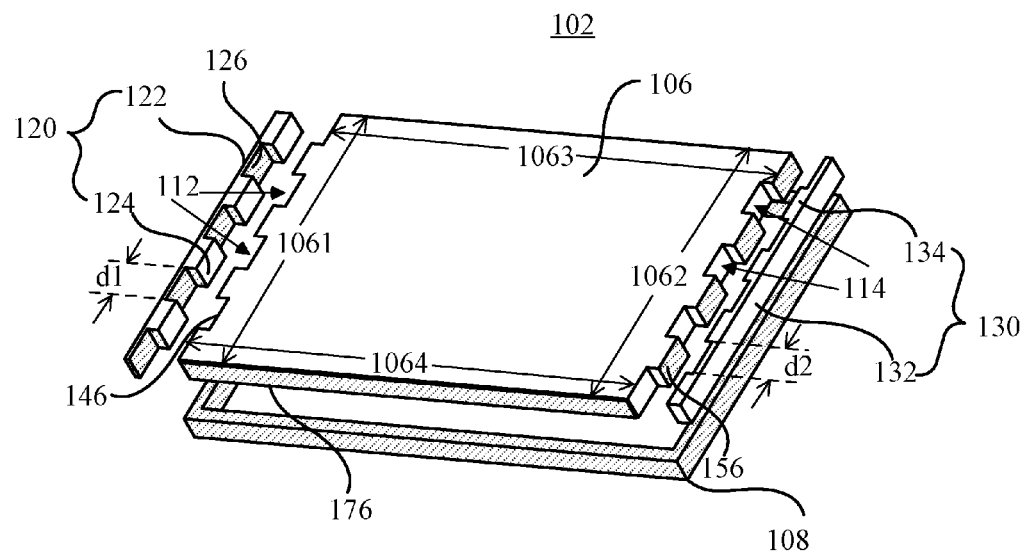
FIG. 3 is an exploded diagram of a backlight module of an auto-stereoscopic display which shows three-dimensional images according to a first embodiment of the present invention.
Figures 4, 5:
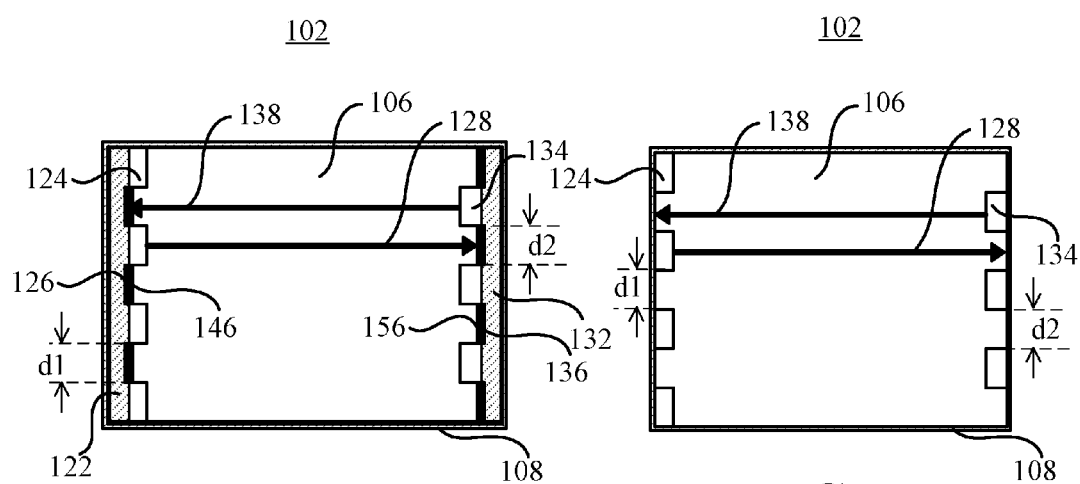
FIG. 4 is a top view of a first light module, a second light module, and a light guide plate shown in FIG. 3.
FIG. 5 is a top view of a first light module, a second light module, and a light guide plate according to a second embodiment of the present invention.

Refer to FIG. 3 and FIG. 4. FIG. 3 is an exploded diagram of a backlight module 102 of an auto-stereoscopic display which shows three-dimensional images according to a first embodiment of the present invention. FIG. 4 is a top view of a first light module 120, a second light module 130, and a light guide plate 106 shown in FIG. 3. An observer can see three-dimensional images produced by the auto-stereoscopic display. The auto-stereoscopic display can be a 3D camera or a 3D display. The backlight module 102 comprises a first light module 120, a second light module 130, a light guide plate 106, and a plastic frame 108. The first light module 120, the second light module 130, and the light guide plate 106 are fixed by the plastic frame 108. The first light module 120 comprises a first substrate 122 and a plurality of first light emitting diodes (LEDs) 124. The first LEDs 124 are disposed on the first substrate 122. A first gap d1 is between every two adjacent first LEDs 124. An opaque element 126 is laid out between every two adjacent first LEDs 124. The second light module 130 comprises a second substrate 132 and a plurality of second LEDs 134. The second LEDs 134 are disposed on and borne by the second substrate 132. A second gap d2 is between every two adjacent second LEDs 134. An opaque element 136 is laid out between every two adjacent second LEDs 134. The LEDs 124 and 134 emit light beams alternatively when three-dimensional images are being displayed. A plurality of first troughs 112 are disposed on a first side 1061 of the light guide plate 106, and a plurality of second troughs 114 are disposed on a second side 1062 facing the first side 1061. Each of the first LEDs 124 is embedded into its corresponding first trough 112, and each of the second LEDs 134 is embedded into its corresponding second trough 114. Preferably, the width of the first gap d1 is the same as that of the second LED 134, and the width of the second gap d2 is the same as that of the first LED 124. As for the length of the two gapes d1 and d2, the first gap d1 and the second gap d2 have the same length, but may also have unequal length based on actual demand.

When the first light module 120 and the second light module 130 are individually attached to the first side 1061 and the second side 1062 of the light guide plate 106, the first LEDs 124 and the second LEDs 134 are arranged asymmetrically. At the same time, an optical axis 128 of the first LEDs 124 is perpendicular to a corresponding second gap d2 of the second substrate 132, and an optical axis 138 of the second LEDs 134 is perpendicular to a corresponding first gap d1 of the first substrate 122. The light emitted from the LEDs 124 and 134 spreads outward from the center, so light intensity is at its greatest on the traces of the two optical axes 128 and 138. Because the optical axis 128 is perpendicular to the corresponding second gap d2, the light emitted from the first LED 124 towards the second side 1062 is mostly absorbed by the opaque element 136 rather than being reflected. Likewise, the light emitted from the second LED 134 towards the first side 1061 is mostly absorbed by the opaque element 126 rather than being reflected. In another embodiment of the present invention, opaque elements 146 and opaque elements 156 are disposed on the contact area of the first side 1061 and the first substrate 122 and on the touch area of the second side 1062 and the second substrate 132, respectively, to strengthen the absorption effect.

Yet in another embodiment of the present invention, opaque elements 176 are laid out both on a third side 1063 and on a fourth side 1064 of the light guide plate 106. The third side 1063 and the fourth side 1064 are perpendicular to the first side 1061 and the second side 1062. Or, the plastic frame 108 can be made of light proof materials. The plastic frame 108 is used to fasten and enclose the first light module 120, the second light module 130, and the light guide plate 106. In this way, the light emitted from the LEDs 124 and 134 can be prevented from being reflected by the third side 1063 and the fourth side 1064 of the light guide plate 106.

The opaque elements 126, 136, 146, 156, and 176 in the embodiments of the present invention can be dark or black adhesive tapes, or dark or black coating.

Refer to FIG. 5, which is a top view of a first light module 120, a second light module 130, and a light guide plate 106 according to a second embodiment of the present invention. The LEDs 124 and 134 can be top-view or side-view ones.

A backlight module 102 of the second embodiment can be applied to an auto-stereoscopic display, other flat panel displays or the like.

Compared with the prior art, the plurality of first LEDs 124 of the first light module 120 and the plurality of second LEDs 134 of the second light module 130 are arranged asymmetrically. Opaque elements are disposed on the gapes in the direction of the optical axis 128 of the first LED 124 and in the direction of the optical axis 138 of the second LED 134. The optical axes 128 and 138 emit light. The opaque elements can absorb reflective light effectively. Owing to the decrease of reflective light, no crosstalk effect from the progress of the light emitted alternatively from the LEDs 124 and 134 occurs when the 3D display operates. Thus, the quality of three-dimensional images remains the same. Moreover, that the LEDs 124 and 134 have a larger light emission angle increases the brightness of the backlight module 100 and reduces a hot spot effect.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A backlight module comprising:
a light guide plate comprising a plurality of first troughs on a first side and a plurality of second troughs on a second side opposite to the first side;
a first light module comprising a first substrate and a plurality of first light emitting diodes disposed on the first substrate, wherein an opaque element disposed on each first gap between the two adjacent first light emitting diodes, each first light emitting diode is correspondingly embedded in one of the plurality of first troughs;
a second light module comprising a second substrate and a plurality of second light emitting diodes disposed on the second substrate, wherein an opaque element disposed on each second gap between the two adjacent second light emitting diodes, each second light emitting diode is correspondingly embedded in one of the plurality of second troughs;
wherein each first light emitting diode is disposed in an alignment to one of the second gaps, each second light emitting diode is disposed in an alignment to one of the first gaps, and the first light emitting diodes and the second light emitting diodes are arranged asymmetrically.

2. The backlight module of claim 1 wherein a plurality of opaque elements are disposed on a third side and a fourth side of the light guide plate, both perpendicular to the first side and the second side.

3. The backlight module of claim 1 wherein the opaque element is dark tape sticking to the first substrate and the second substrate.

4. The backlight module of claim 1 wherein the opaque element is dark coating on the first substrate and the second substrate.

5. The backlight module of claim 1 wherein the opaque elements stick to contact areas of the first and second sides of the light guide plate and the first substrate and the second substrate.

6. The backlight module of claim 1, further comprising a plastic frame for fixing the first light module, the second light module, and the light guide plate, wherein the plastic frame is made of opaque material.

* * * * *